(12) United States Patent
Chen et al.

(10) Patent No.: US 12,206,809 B2
(45) Date of Patent: Jan. 21, 2025

(54) LENS MODULE EASILY DISASSEMBLED FROM TERMINAL DEVICE AND TERMINAL DEVICE

(71) Applicant: TRIPLE WIN TECHNOLOGY(SHENZHEN) CO. LTD., Shenzhen (CN)

(72) Inventors: Ying-Lin Chen, New Taipei (TW); Hui-Hui Shangguan, Jin Cheng (CN); Hu Zhu, Jin Cheng (CN); Xiao-Fei Wang, Jin Cheng (CN); Zheng-Zhi Lun, Jin Cheng (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 290 days.

(21) Appl. No.: 17/708,213

(22) Filed: Mar. 30, 2022

(65) Prior Publication Data

US 2023/0208953 A1    Jun. 29, 2023

(30) Foreign Application Priority Data

Dec. 29, 2021   (CN) .......................... 202111642225.3

(51) Int. Cl.
| | | |
|---|---|---|
| H04N 5/335 | (2011.01) | |
| G02B 7/14 | (2021.01) | |
| H04M 1/02 | (2006.01) | |
| H04N 23/55 | (2023.01) | |

(52) U.S. Cl.
CPC ............ *H04M 1/0264* (2013.01); *G02B 7/14* (2013.01); *H04N 23/55* (2023.01)

(58) Field of Classification Search
CPC ....................................................... G02B 7/14
See application file for complete search history.

(56) References Cited

U.S. PATENT DOCUMENTS

| | | | | |
|---|---|---|---|---|
| 2004/0132491 A1* | 7/2004 | Kim | ....................... | H04N 23/55 |
| | | | | 348/E5.025 |
| 2005/0285973 A1* | 12/2005 | Singh | ..................... | H04N 23/54 |
| | | | | 348/340 |
| 2007/0097518 A1* | 5/2007 | Sanou | ..................... | H04N 23/55 |
| | | | | 359/694 |
| 2010/0055941 A1* | 3/2010 | Dittmann | ............... | H05K 1/118 |
| | | | | 29/847 |
| 2018/0198966 A1* | 7/2018 | Tang | ..................... | H04N 23/51 |

FOREIGN PATENT DOCUMENTS

CN             102857680 A       1/2013

* cited by examiner

*Primary Examiner* — Gary C Vieaux
(74) *Attorney, Agent, or Firm* — ScienBiziP, P.C.

(57) ABSTRACT

An easily disassembled lens module in a terminal device includes a lens assembly, a circuit board, and a structural member. The circuit board includes a first portion, a second portion, and a third portion which are connected in sequence. The first portion is connected to the lens assembly, the second portion and the third portion protrude from the lens assembly. The structural member includes a connecting portion fixed on the third portion and at least one pulling portion protruding from the third portion. After installation in the terminal device, the lens assembly can be disassembled by using the at least one pulling portion to pull on the structural member so that the lens assembly can be disassembled without using tools and without causing damage.

18 Claims, 10 Drawing Sheets

LENS MODULE EASILY DISASSEMBLED FROM TERMINAL DEVICE AND TERMINAL DEVICE

FIELD

The subject matter herein generally relates to terminal manufacture, and more particularly, to a lens module easily disassembled from a terminal device and the terminal device.

BACKGROUND

A lens module is usually found in terminal devices such as cameras and mobile phones. The terminal device is itself smaller and smaller, and the lens module must also grow smaller in size. Thus, the lens module is difficult to be disassembled when repair or replacement of the lens module is needed. Tools used during a disassembly process may cause damage to the lens module or other components in the terminal device.

BRIEF DESCRIPTION OF THE DRAWINGS

Implementations of the present technology will now be described, by way of example only, with reference to the attached figures.

DETAILED DESCRIPTION

Figure 1:
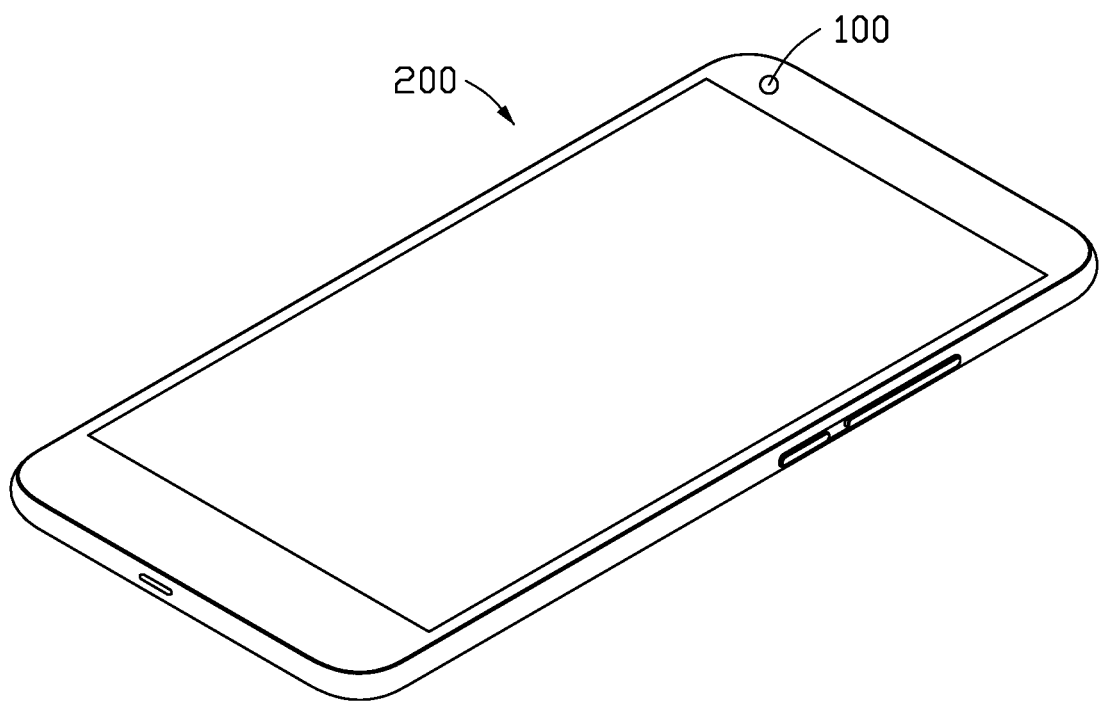
FIG. 1 is a diagrammatic view of an embodiment of a terminal device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a terminal device 200 is provided in an embodiment. The terminal device 200 includes a lens module 100. The terminal device 200 may be, but is not limited to, a mobile phone, a camera, a video camera, a monitor, and the like. In the embodiment, the terminal device 200 is a mobile phone.

Figure 2:
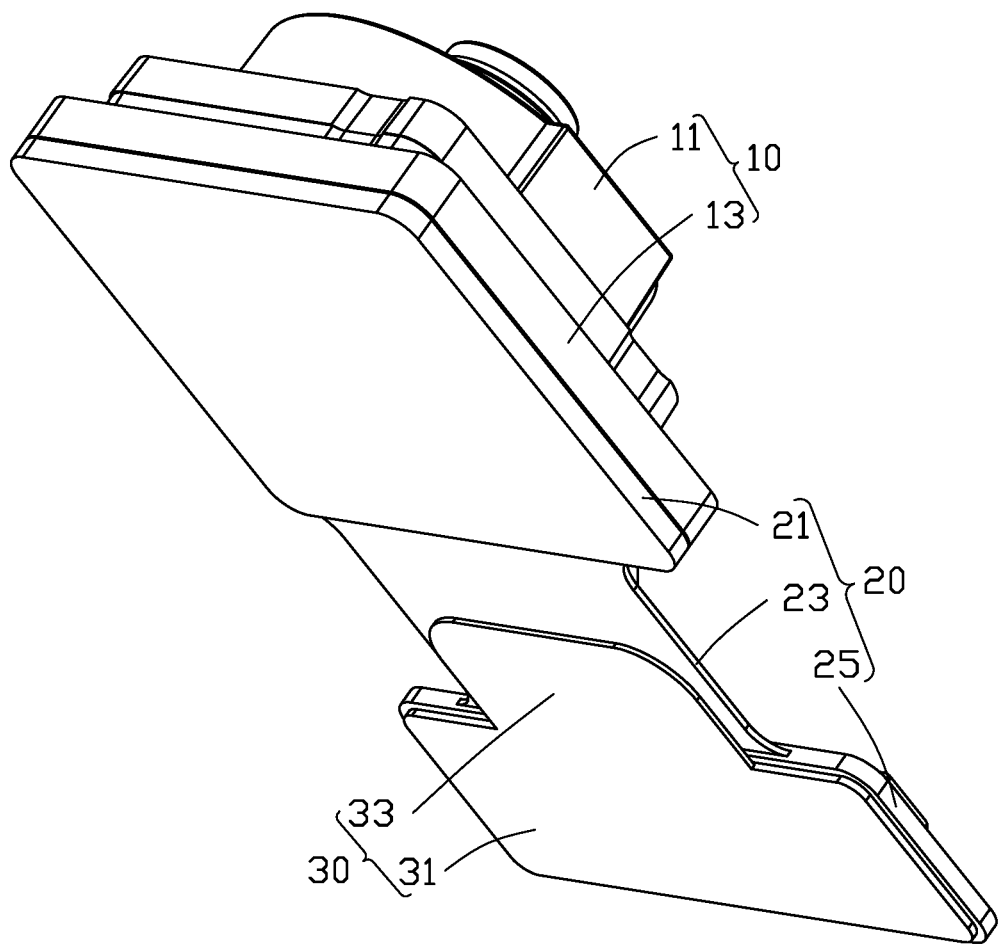
FIG. 2 is a diagrammatic view of an embodiment of a lens module of the terminal device according to the present disclosure.
Figure 3:
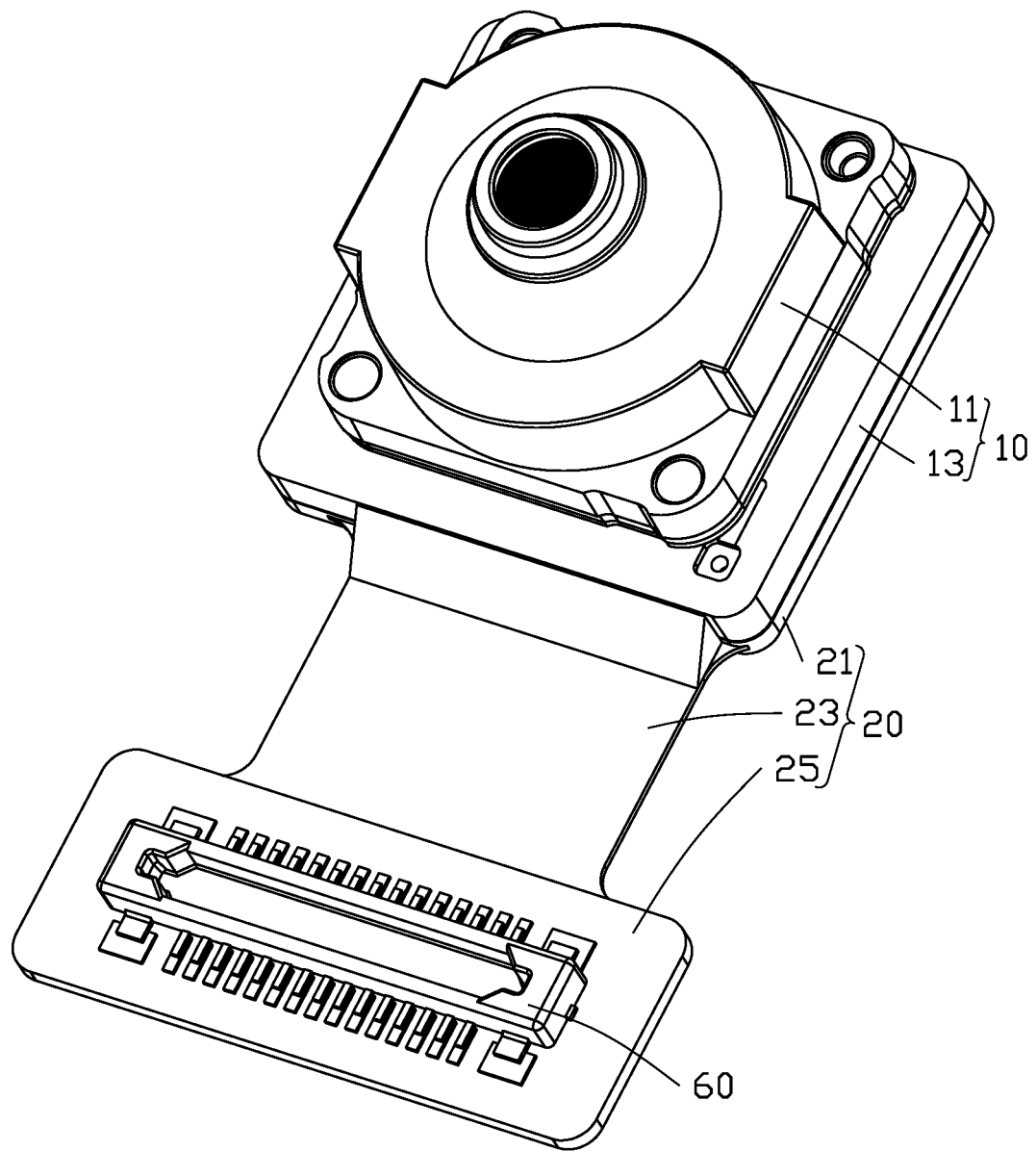
FIG. 3 is similar to FIG. 2, but showing the lens module from another angle.
Figure 4:
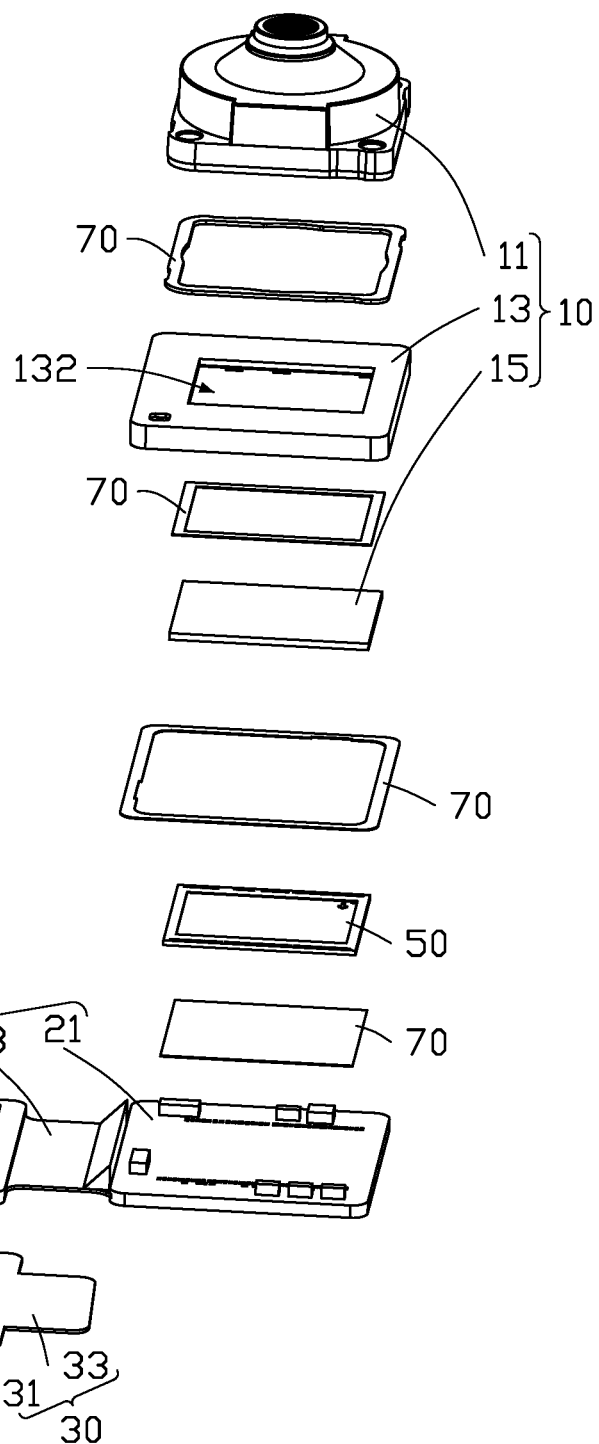
FIG. 4 is an exploded view of the lens module of FIG. 2.

Referring to FIGS. 2, 3, and 4, the lens module 100 includes a lens assembly 10, a circuit board 20, and a structural member 30.

In the embodiment, the lens assembly 10 includes a lens 11, a bracket 13, and a filter 15. In some embodiments, the lens assembly 10 may further include a voice coil motor, and the voice coil motor may include independent components.

In the embodiment, the lens 11, the bracket 13, and the filter 15 are assembled together. The bracket 13 includes a through hole 132. The bracket 13 is disposed between the lens 11 and the filter 15. The lens 11 and the bracket 13 are connected by a glue 70, and the bracket 13 and the filter 15 are connected by another glue 70. A surface of the bracket 13 facing away from the lens 11 and adjacent to the through hole 132 is recessed toward the lens 11 to form a groove (not shown). The groove accommodates the filter 15, for a reduced thickness of the lens assembly 10 along an optical axis of the lens module 100. In addition, a distance between the filter 15 and the circuit board 20 can be adjusted according to the depth of the groove.

In other embodiments, the groove can also be provided on a surface of the bracket 13 facing the lens 11. The filter 15 is accommodated in the groove of the bracket 13, and the glue 70 bonds the filter 15 and the bracket 13 together.

The circuit board 20 is connected to the lens assembly 10. The circuit board 20 is disposed on one side of the bracket 13 away from the lens 11, and the circuit board 20 and the bracket 13 are connected by the glue 70. The circuit board 20 is spaced apart from the filter 15.

The circuit board 20 may be a flexible board, a rigid board, or a flexible-rigid combination board.

The circuit board 20 includes a first portion 21, a second portion 23, and a third portion 25 which are connected in sequence. The second portion 23 is disposed between the first portion 21 and the third portion 25. The first portion 21 is connected to the bracket 13 through the glue 70, and the second portion 23 and the third portion 25 protrude from the lens assembly 10.

Figure 6:
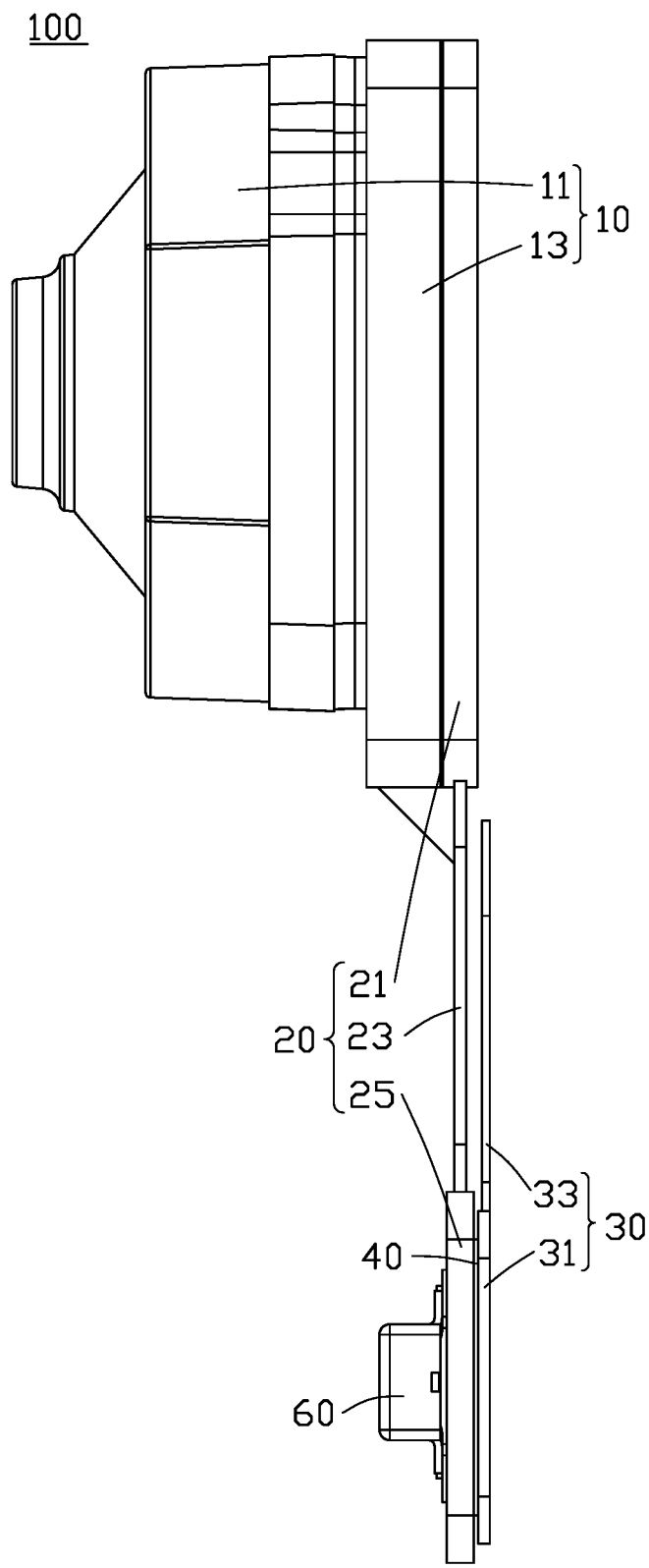
FIG. 6 is a right side view of the lens module of FIG. 2.
Figure 7:
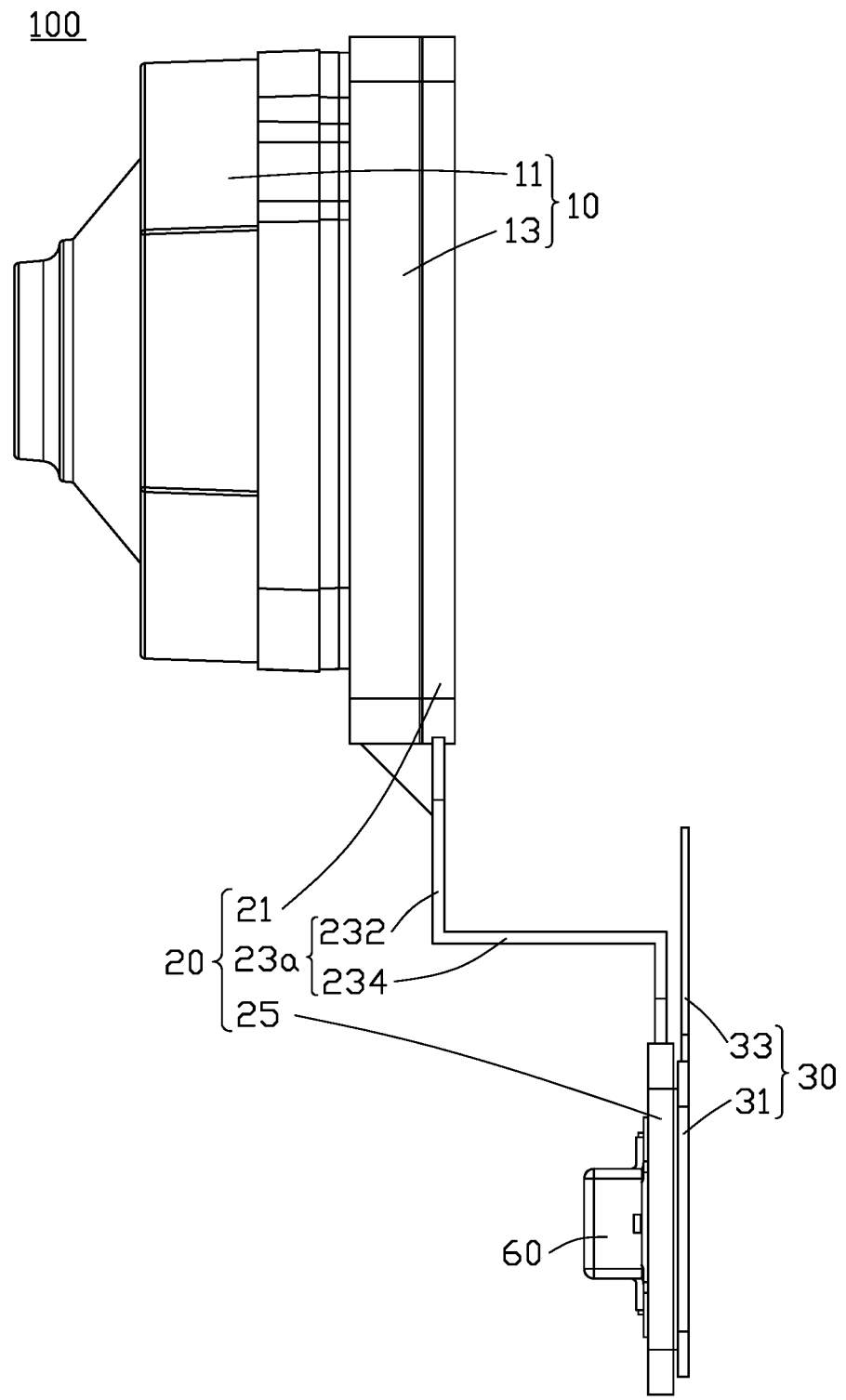
FIG. 7 is a right side view of another embodiment of a lens module according to the present disclosure.

An angle of bending between the first portion 21 and the second portion 23, and an angle of bending between the second portion 23 and the third portion 25 can be set according to an actual need of the lens module 100. For example, referring to FIGS. 5 and 6, in some embodiments, the first portion 21, the second portion 23, and the third portion 25 are on a same plane. Referring to FIG. 7, in some embodiments, a second portion 23a can be bent. The second portion 23a includes a first bending area 232 and a second bending area 234 perpendicular to the first bending area 232. The first bending area 232 is connected to the first portion 21, and the first bending area 232 and the first portion 21 are on a same plane. The second bending area 234 is connected to the third portion 25 and is perpendicular to the third portion 25. The first portion 21 is parallel to the third portion 25. In some embodiments, the first portion 21, the second portion 23, and the third portion 25 may be perpendicular to each other. In other embodiments, the angles can be set as required. For example, such angle may be acute or obtuse.

Referring to FIGS. 2 to 6, the structural member 30 includes a connecting portion 31 and a pulling portion 33 connected to each other. The connecting portion 31 is fixedly connected to the third portion 25. The pulling portion 33 protrudes from the third portion 25. The pulling portion 33 is directly connected with only the connecting portion 31, that is, the pulling portion 33 is not directly connected with other components in the lens module 100. When the lens module 100 is installed in the terminal device 200, the lens assembly 10 can be disassembled by pulling on the pulling portion 33, so that the lens assembly 10 can be disassembled. No external tools are needed during the disassembly process, and damage to the lens assembly 10 or other components in the terminal device 200 is avoided.

Figure 5:
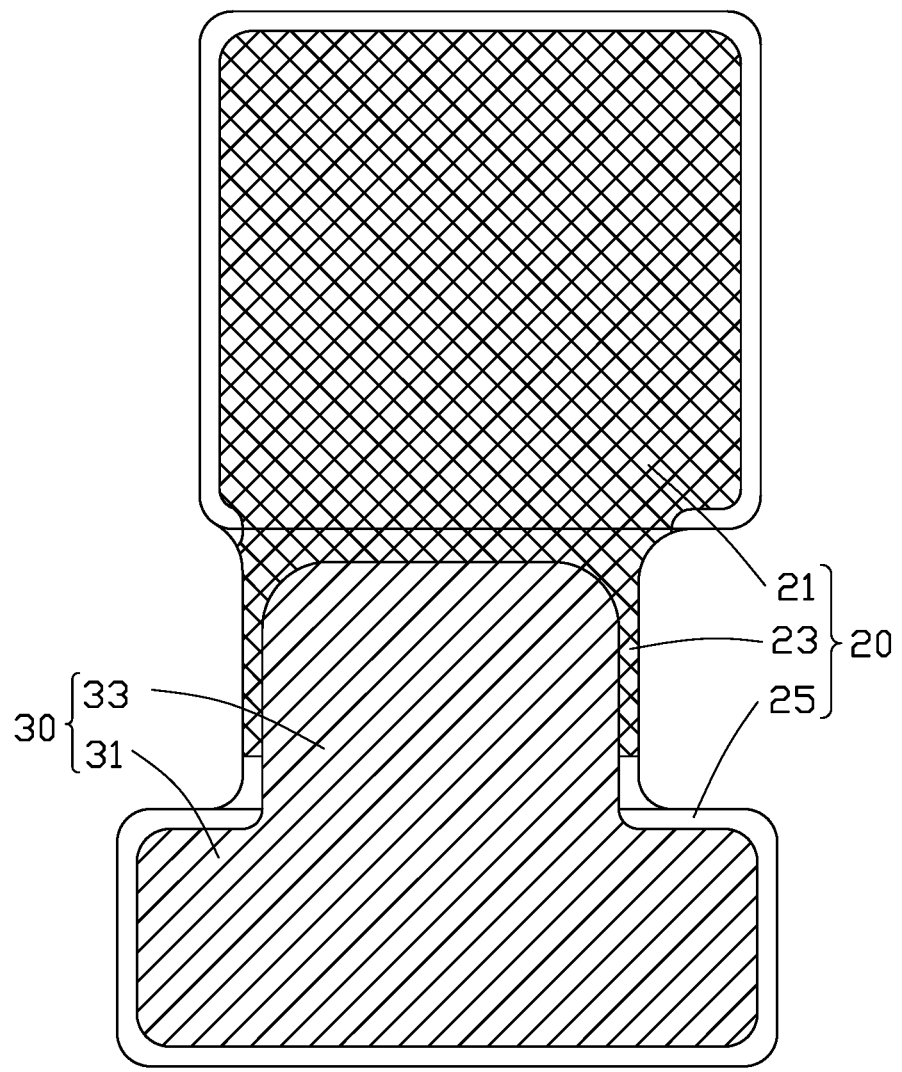
FIG. 5 is a bottom plan view of the lens module of FIG. 2.
Figure 8:
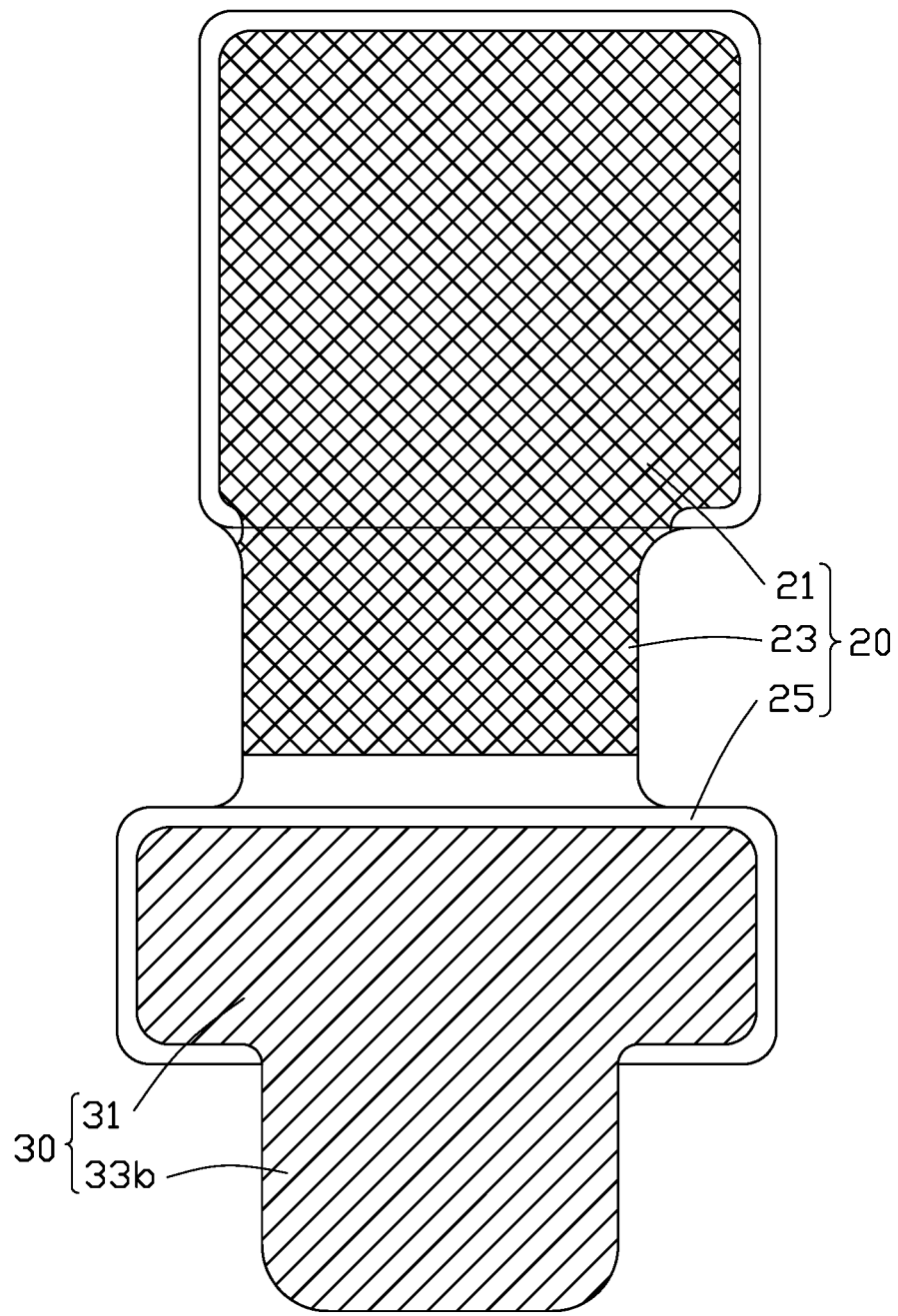
FIG. 8 is a bottom plan view of yet another embodiment of a lens module according to the present disclosure.
Figure 9:
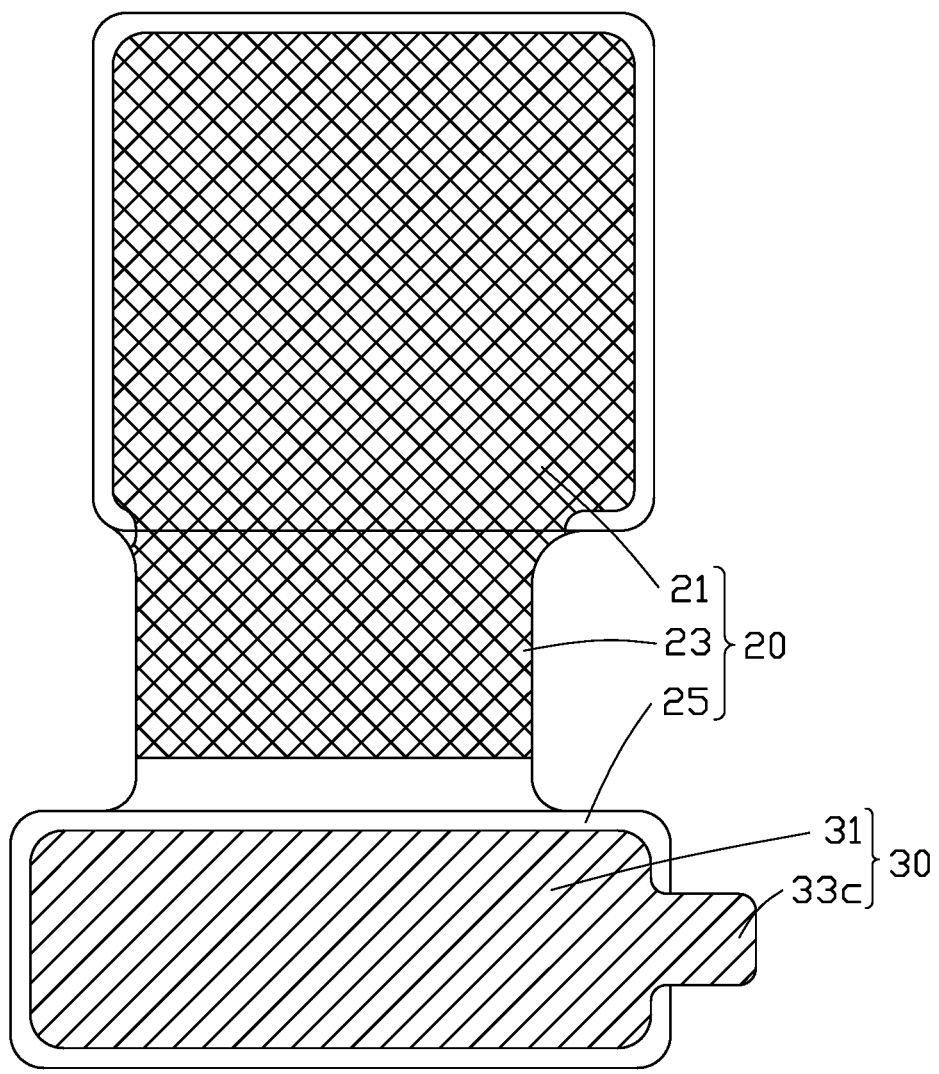
FIG. 9 is a bottom plan view of yet another embodiment of a lens module according to the present disclosure.
Figure 10:
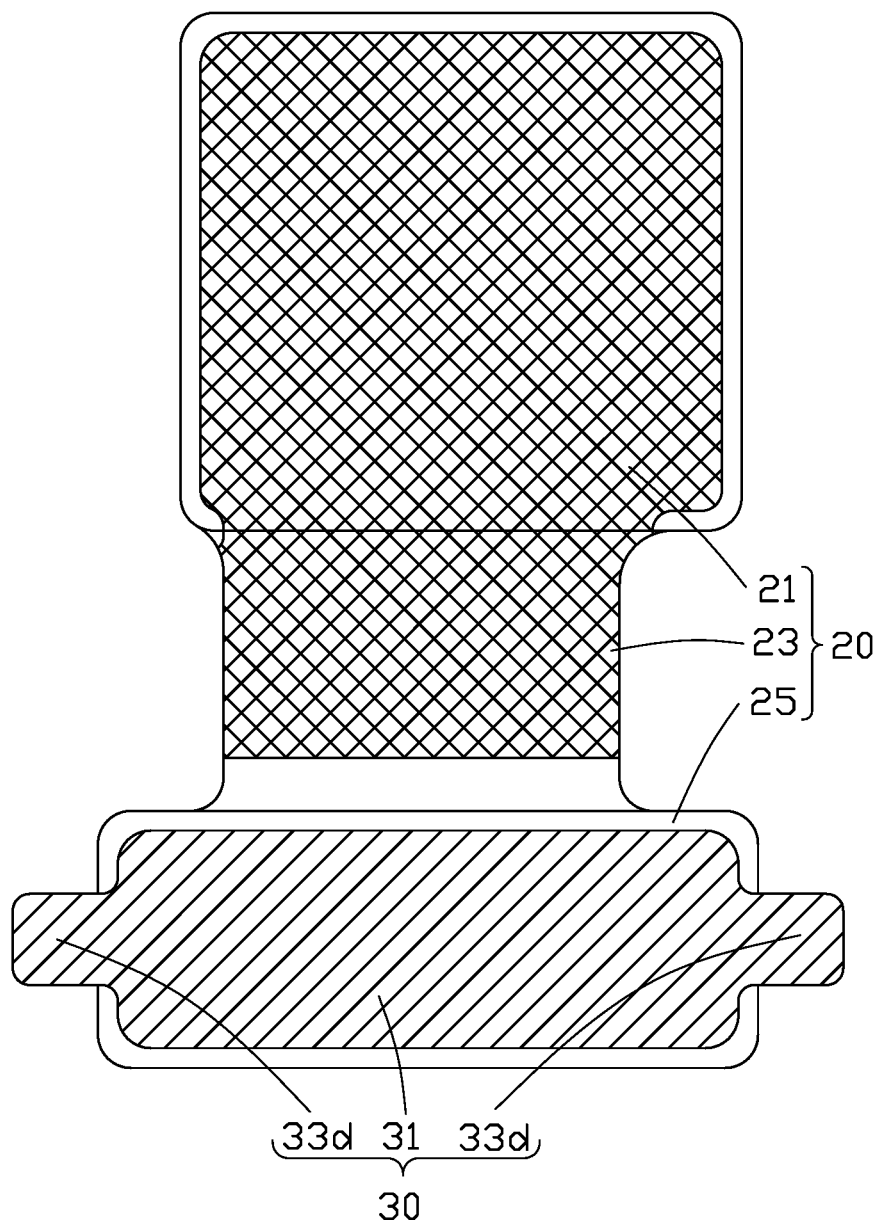
FIG. 10 is a bottom plan view of yet another embodiment of a lens module according to the present disclosure.

A protruding direction of the pulling portion 33 is not limited. Referring to FIGS. 5 and 6, in some embodiments, the first portion 21, the second portion 23, and the third portion 25 of the circuit board 20 are on the same plane, and the pulling portion 33 extends toward the direction of the first portion 21. Referring to FIG. 8, in some embodiments, a pulling portion 33b extends away from the first portion 21. Referring to FIG. 9, in some embodiments, the protruding direction of a pulling portion 33c is perpendicular to the first portion 21, the second portion 23, and the third portion 25 when connected. Referring to FIG. 10, in some embodiments, the protruding direction of a pulling portion 33d is perpendicular to the first portion 21, the second portion 23, and the third portion 25 when connected. Referring to FIG. 7, in some embodiments, the second portion 23a is bent at a right angle and connects the first portion 21 and the third portion 25. The first portion 21 is parallel to the third portion 25, the pulling portion 33 is parallel to the third portion 25 and protrudes from the third portion 25, and the pulling portion 33 is suspended from the second portion 23a. Other components of the terminal device 200 can be set in the suspended area to make full use of the space. It can be understood that the angle of bending of the second portion 23a is not limited to a right angle, but can also be acute or obtuse.

There may be one pulling portion 33 or more than one. When there is one pulling portion 33, material of the structural member 30 is saved, and space occupied by the lens module 100 can be saved at the same time. Referring to FIG. 10, when there are a plurality of pulling portions 33d, the protruding directions of the pulling portions 33d may be varied or a combination of the above protrusion directions.

The structural member 30 is made of insulating material, such as plastic, rubber, fiber, and the like.

In some embodiments, the structural member 30 is flexible. In one embodiment, the structural member 30 is made of polyimide (PI). When the lens module 100 is assembled in the terminal device 200, the pulling portion 33 can be bent, and the pulling portion 33 and the connecting portion 31 may not be on the same plane, improving the utilization of space. Other specific environment restrictions may require that the pulling portion 33 is bent in other manner.

Referring to FIG. 6, in some embodiments, the connecting portion 31 is connected to the third portion 25 through a thermosetting adhesive 40. The thermosetting adhesive 40 not only bonds the structural member 30 and the circuit board 20 together, but the thermosetting adhesive 40 has a certain hardness after curing which increases the hardness and robustness of the third portion 25. Thus, a reinforcing plate on the third portion 25 is not needed.

Referring to FIG. 4, the lens module 100 further includes a photosensitive chip 50. The photosensitive chip 50 is disposed on the first portion 21 facing the bracket 13, and the photosensitive chip 50 and the filter 15 are spaced apart from each other.

Referring to FIGS. 3 and 4, the lens module 100 further includes a connector 60 disposed on the third portion 25 facing away from the structural member 30. The connector 60 provides electrical connection between the lens module 100 and an external circuit (not shown). In the embodiment, the connector 60 and the lens assembly 10 are disposed on the same side of the circuit board 20.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module, comprising:
   a lens assembly;
   a circuit board comprising a first portion, a second portion, and a third portion connected in sequence, the first portion connected to the lens assembly, each of the second portion and the third portion protruding from the lens assembly; and
   a structural member comprising a connecting portion and at least one pulling portion, the connecting portion fixed on the third portion, the at least one pulling portion protruding from the third portion and not being directly connected with the circuit board, the structural member being flexible, and the at least one pulling portion configured to be bent relative to the connecting portion.

2. The lens module of claim 1, wherein the second portion comprises a first bending area and a second bending area, an angle is defined between the first bending area and the second bending area; the first bending area is connected to the first portion, the second bending area is connected to the third portion, and the at least one pulling portion protrudes from the second portion.

3. The lens module of claim 2, wherein the first bending area is perpendicular to the second bending area.

4. The lens module of claim 1, wherein the first portion, the second portion, and the third portion are on a same plane; the at least one pulling portion extends toward the first portion.

5. The lens module of claim 1, wherein the first portion, the second portion, and the third portion are on a same plane; a protruding direction of the at least one pulling portion is perpendicular to the first portion, the second portion, and the third portion when connected.

6. The lens module of claim 1, wherein the at least one pulling portion comprises a plurality of pulling portions.

7. The lens module of claim 1, wherein the structural member is made of plastic, rubber, or fiber.

8. The lens module of claim 1, wherein the structural member is made of polyimide.

9. The lens module of claim 1, wherein the lens module further comprises a thermosetting adhesive, the thermosetting adhesive bonds the third portion and the connecting portion together.

10. A terminal device, comprising:
    a lens module, comprising:

a lens assembly;

a circuit board comprising a first portion, a second portion, and a third portion connected in sequence, the first portion connected to the lens assembly, each of the second portion and the third portion protruding from the lens assembly; and a structural member comprising a connecting portion and at least one pulling portion, the connecting portion fixed on the third portion, the at least one pulling portion protruding from the third portion and not being directly connected with the circuit board, the structural member being flexible, and the at least one pulling portion configured to be bent relative to the connecting portion.

11. The terminal device of claim 10, wherein the second portion comprises a first bending area and a second bending area, an angle is defined between the first bending area and the second bending area; the first bending area is connected to the first portion, the second bending area is connected to the third portion, and the at least one pulling portion protrudes from the second portion.

12. The terminal device of claim 11, wherein the first bending area is perpendicular to the second bending area.

13. The terminal device of claim 10, wherein the first portion, the second portion, and the third portion are on a same plane; the at least one pulling portion extends toward the first portion.

14. The terminal device of claim 10, wherein the first portion, the second portion, and the third portion are on a same plane; a protruding direction of the at least one pulling portion is perpendicular to the first portion, the second portion, and the third portion when connected.

15. The terminal device of claim 10, wherein the at least one pulling portion comprises a plurality of pulling portions.

16. The terminal device of claim 10, wherein the structural member is made of plastic, rubber, or fiber.

17. The terminal device of claim 10, wherein the structural member is made of polyimide.

18. The terminal device of claim 10, wherein the lens module further comprises a thermosetting adhesive, the thermosetting adhesive bonds the third portion and the connecting portion together.

* * * * *